United States Patent [19]

Chen et al.

[11] Patent Number: 5,342,567
[45] Date of Patent: Aug. 30, 1994

[54] PROCESS FOR PRODUCING HIGH TENACITY AND HIGH MODULUS POLYETHYLENE FIBERS

[75] Inventors: Wei-Liang Chen, Hsinchu; Dah-Ming Lee, Keelung; Lien-Tai Chen, Tainan; Ming-Tao Yeh, Taipei Hsien, all of Taiwan

[73] Assignee: Industrial Technology Research Institute, Hsinchu, Taiwan

[21] Appl. No.: 89,177

[22] Filed: Jul. 8, 1993

[51] Int. Cl.$^5$ .............................. D01F 6/04; D02J 1/22
[52] U.S. Cl. .................. 264/203; 264/210.7; 264/210.8
[58] Field of Search ................ 264/203, 210.7, 210.8

[56] References Cited

U.S. PATENT DOCUMENTS

| | | | |
|---|---|---|---|
| 3,048,465 | 8/1962 | Jurgeleit | 264/203 |
| 3,962,205 | 6/1976 | Ward | 526/352 |
| 4,020,266 | 4/1977 | Frank | 528/498 |
| 4,137,394 | 1/1979 | Meihuizen | 528/502 |
| 4,344,908 | 8/1982 | Smith | 264/203 |
| 5,286,435 | 2/1994 | Slutsker et al. | 264/203 X |

FOREIGN PATENT DOCUMENTS

| | | | |
|---|---|---|---|
| 904008 | 8/1962 | United Kingdom | 264/203 |

OTHER PUBLICATIONS

The Properties of Polyethylene Crystallized Under the Orientation and Pressure Effects of a Pressure Capillary Viscometer (1990 by John Wiley & Sons, Inc.) (Journal of Applied Polymer Science vol. 14, pp. 2305-2317 (1970)) Southern et al.

On Ultra-High Tensile by Drawing Single Crystal Mats of High Molecular Weight Polyethylene (Polymer Journal. vol. 15, No. 4, pp. 327-329 (1983)) Kanamoto.

*Primary Examiner*—Leo B. Tentoni
*Attorney, Agent, or Firm*—W. Wayne Liauh

[57] ABSTRACT

A process for producing high tenacity and high modulus polyethylene fiber gel spinning. Cycloalkane and cycloalkene are selected as solvents for dissolving ultra-high molecular weight polyethylene, and a volatile solvent such as cyclohexanone or a mixture thereof is selected as an extracting solvent. The present process allows the extracted fibers to be stretched directly after the spinning step without requiring an intermediate winding step. The resulting fibers from the present invention have a tenacity greater than 15 g/d, a modulus greater than 350 g/d, an elongation at break less than 10%, and a crystallinity greater than 60%.

13 Claims, 4 Drawing Sheets

PROCESS FOR PRODUCING HIGH TENACITY AND HIGH MODULUS POLYETHYLENE FIBERS

FIELD OF THE INVENTION

The present invention relates to polyethylene fibers of high tenacity and high modulus. More particularly, the present invention relates to an improved process for fiber spinning ultra-high molecular weight polyethylene and hot stretching the same to produce high tenacity and high modulus polyethylene fibers.

BACKGROUND OF THE INVENTION

High tenacity and high modulus polyethylene fibers, due to their superior chemical and mechanical properties, such as low density, excellent chemical, ultraviolet ray and abrasion resistance, and excellent impact strength, have been widely used in the manufacturing a wide variety of industrial articles, and are considered an important engineering plastics.

A number of the processes for producing high tenacity and high modulus polyethylene fibers have been disclosed in the prior art. These include the ultra-high drawing method, solid state extrusion method, zone drawing method, and gel spinning method. Among these methods, only the gel spinning method has proved to be feasible for large scale productions and has been commercialized. The reason that the gel spinning method is particularly suitable for manufacturing high tenacity and high modulus polyethylene fibers is that the dissolution of polyethylene by solvent to form a very dilute solution enables a reduction of the number and degree of entanglements among the various polyethylene molecular chains, thus facilitating subsequent stretching of the polyethylene molecules and allowing the same to more easily assume a fully extended chain conformation. By assuming the fully extended chain conformation, the polyethylene molecules can ultimately be spun into high tenacity and high modulus fibers.

A number of different gel spinning methods have been commercialized. For example, Spectra (which is a trade name for polyethylene fibers made by Allied Corporation, U.S.A.), Dyneema (a trade name for polyethylene fibers made by DSM Corporation, The Netherlands, and Toyobo K.K., Japan), and Tekmilon (a trade name for polyethylene fibers made by Mitsui Petrochemical Industries, Ltd. Japan) are all commercially available polyethylene fibers manufactured by the gel spinning method, and all have a tenacity of at least 30 g/denier.

The gel spinning methods for manufacturing the polyethylene fibers in the above-mentioned commercialized products all comprise the steps of forming a solution of ultra high molecular weight polyethylene in a nonvolatile solvent, extruding the polyethylene solution through a plurality of capillary holes to form gel fibers therefrom, extracting the gel fibers with a volatile solvent, winding up the extracted fibers, and finally stretching the wound-up fibers to produce the final product.

The most commonly used solvents for the preparation of gel solution of polyethylene are decalin, paraffin oil, dodecane, xylene, toluene, trichlorobenzene, and tetralin. For example, Allied Corporation and Mitsui Petrochemical Industries, Ltd. use paraffin oil as the solvent for dissolving polyethylene, while DSM Corporation and Toyobo K.K. use decalin as the solvent for dissolving polyethylene. However, the prior art solvents have a number of disadvantages, for example, in that they either do not have a sufficient solubility, or the extraction rate of these solvents from the gel fiber is generally unsatisfactorily slow, or both. As a consequence of the slow extraction rate, The gel fibers must be wound up after the extraction step, but prior to the stretching step, in order to accommodate the slow extraction rate which requires a relatively low spinning speed. In other words, the slow extraction rate of the prior art process necessitates an intermediate winding step between the extraction step and the stretching to allow for a slower spinning rate. These disadvantages of the prior art methods thus necessitate the division of the polyethylene making process into three separate stages: spinning, extraction and stretching. This slows down the spinning rate and burdens the production efficiency of the gel spinning process in making polyethylene fibers.

SUMMARY OF THE INVENTION

Having discussed the shortcomings of the prior art processes in manufacturing polyethylene fibers, it is therefore a primary object of the present invention to provide a more economic and efficient process for the production of high tenacity and high modulus polyethylene fibers.

In order to attain the above described object, the present invention employs a novel system of solvents comprising two types of solvents, one for the dissolution of the polyethylene polymer and the other for the extraction of the first solvent. These solvents cooperatively provide improved solubility, and yet they can be extracted during the extraction step at a greater speed to improve the production efficiency and therefore reduce the cost of making high tenacity and high modulus polyethylene fibers. More specifically, the process for producing high tenacity and high modulus polyethylene fibers according to the present invention comprising the following steps:

(a) forming a 2-20 wt % polyethylene solution containing a polyethylene polymer dissolved in a first solvent selected from the group consisting of cycloalkane, cycloalkene and their derivatives, or a mixture thereof, the first solvent having a boiling point above 100° C., and the polyethylene polymer having a weight average molecular weight between $2 \times 10^5$ and $4 \times 10^6$;

(b) extruding the polyethylene solution through a spinneret to form a gel fiber at a temperature above 120° C.;

(c) extracting the first solvent from the gel fiber with a second solvent selected from the group consisting of methanol, ethanol, ether, acetone, cyclohexanone, 2-methylpentanone, dichloromethane, n-hexane, heptane, trichlorotrifluroethane, diethyl ether and dioxane, or a mixture thereof; and (d) stretching the gel fiber directly after the extraction step and without an intermediate winding step at a stretching ratio of at least 10 to 1.

The present invention also discloses a polyethylene fiber prepared from the above described gel spinning process without the need for an intermediate winding step. The polyethylene fiber disclosed in the present invention has a tenacity of at least 15 g/denier, a modulus of at least 350 g/denier, an elongation at break of less than 10%, and a crystallinity greater than 60%.

BRIEF DESCRIPTION OF THE DRAWINGS

The present invention can be more fully understood from the subsequent detailed description of the preferred embodiment and examples, with references made to the accompanying figures, wherein.

DETAILED DESCRIPTION OF THE INVENTION

Figure 1:
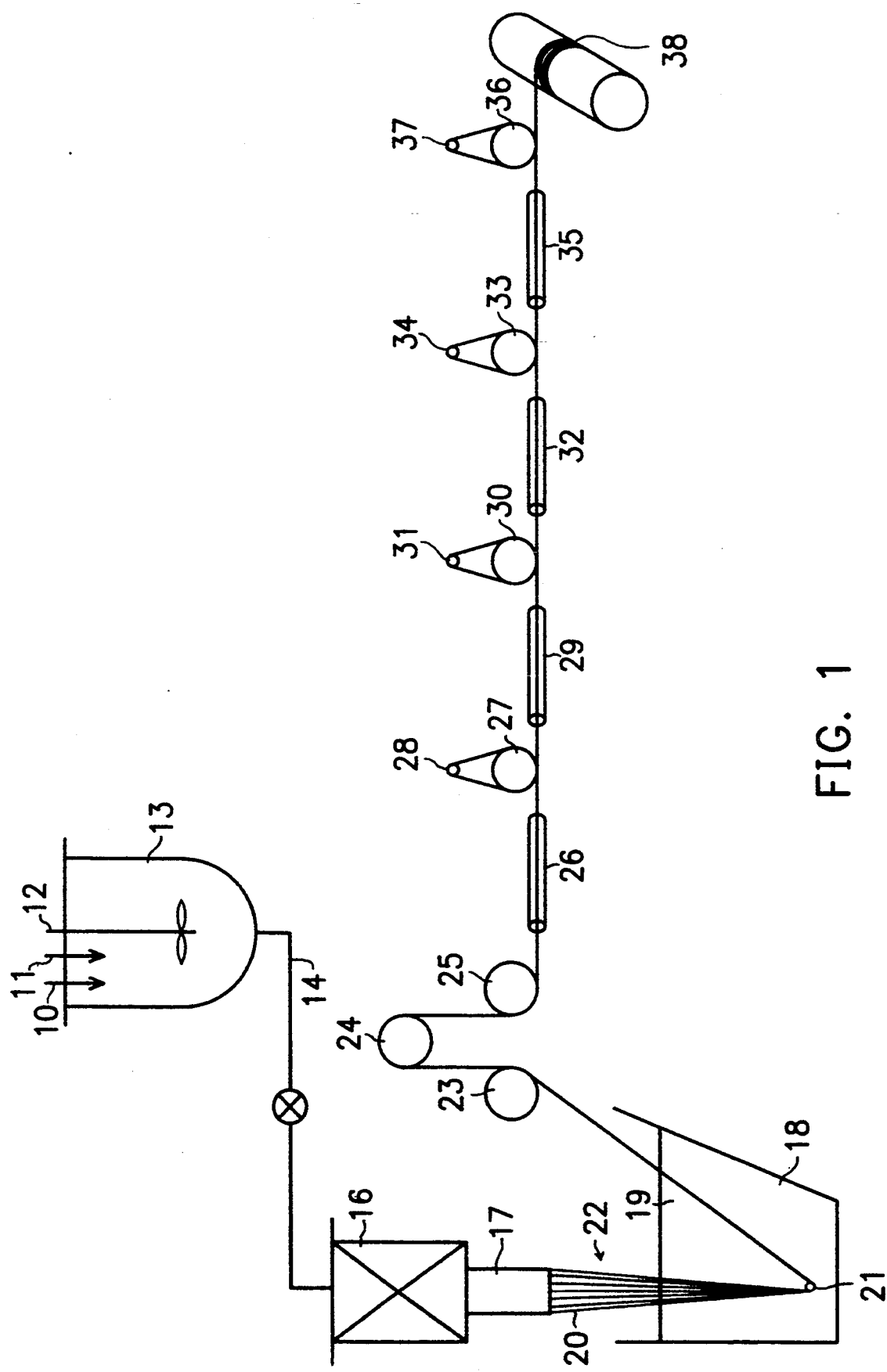
FIG. 1 is a schematic diagram of a preferred embodiment of the process of the present invention.

The weight-average molecular weight of the polyethylene polymer suitable for the process of this invention is preferably between $2 \times 10^5$ and $4 \times 10^6$. More preferably, the ultra-high molecular weight polyethylene polymer to be used should have a relatively narrow molecular weight distribution, with $M_w/M_n$ preferably less than 10.

The first solvents for dissolving the polyethylene polymer according to the present invention include cycloalkane and cycloalkene, or a mixture thereof. These solvents should have a boiling point greater than 100° C. Example of these solvents are carene, fluorene, camphene, menthane, dipentene, naphthalene, acenaphthene, methylcyclopentadien, tricyclodecane, 1,2,4,5-tetramethyl-1,4-cyclohexadiene, fluorenone, naphthindane, tetramethyl-p-benzodiquinone, ethylfuorene, fluoranthene, and naphthenone.

It is preferred that the polyethylene polymer be present in the first solvent at a concentration of about 2 to 20 weight percent, or more preferably from 2 to 15 weight percent. Usually, 0.5 to 1.5 weight percent of appropriate antioxidants are also added. To achieve complete dissolution of the polyethylene polymer in the first solvent, the solution can be heated to between 130° C. and 200° C. with agitation.

The capillary diameter of the spinneret is preferably between 0.2 mm to 5 mm. The length of the capillary in the direction of flow should normally be at least 2 times the capillary diameter, preferably at least 5 times the capillary diameter. The shape of the capillary may be critical, and can be circular, elongated or cross-shaped.

The polyethylene polymer solution is extruded through the spinneret at a controlled spinning temperature and a controlled pressure. Preferably, the spinning temperature should be at least 120° C., or more preferably in the range of 120° C. to 180° C. Preferably, the pressure should be less than 15 KPa, or more preferably less than 1.5 KPa. The extruded gel fibers then are directed to pass through an air gap, which optionally can be an enclosed environment and filled with an inert gas such as nitrogen. The length of this air gap is preferably 2 to 45 cm.

The extraction of the gel fibers after the extrusion (i.e., spinning) step with a second solvent is conducted in a manner wherein the first solvent in the gel can be readily replaced by the second solvent of the solvent system of the invention without causing significant changes in the polyethylene gel structure. Suitable second solvents include ethanol, ether, acetone, cyclohexanone, 2-methylpentanone, n-hexane, dichloromethane, trichlorotrifluoroethane, diethyl ether, and dioxane, or a mixture thereof. The preferred second solvent is ethanol, cyclohexanone, n-hexane, or dichloromethane. Admixture of the above-mentioned solvents can also be used. For example, a preferred mixed solvent is a mixture of cyclohexanone and any other of the above-mentioned second solvents.

Stretching the gel fiber is a critical step in the manufacturing of high tenacity and high modulus polyethylene fibers according to the process disclosed in the present invention. Stretching may be conducted in a single stage or it may be conducted in two or more stages. Preferably, stretching is conducted in three stages, with the first stage being conducted at a temperature of 80°–120° C. and a stretch ratio of at least 3 to 1; the second stage being conducted at a temperature of 100°–130° C. and a stretch ratio of at least 2 to 1; and the third stage being conducted at a temperature of 120°–150° C. and a stretch ratio of at least 2 to 1.

The gel fibers thus formed according to process disclosed in this invention can be directly subject to solvent extraction without water cooling, which is required in the prior art methods. The extracted fibers can then be subject to stretching directly after the extraction step without the intermediate winding step, which is also required in the prior art. The integrated spinning-/extraction/stretching process of this invention, therefore, is significantly simpler and more efficient than those disclosed in the prior art. These advantages are the result of the novel solvent system disclosed in the present invention which provide a superior solubility of the polyethylene polymer used in the spinning process, combined with the high extraction rate between the first and second solvents of the solvent system.

The polyethylene fibers produced by the present invention have superior properties including a tenacity of at least 15 g/denier, a tensile modulus of at least 350 g/denier, an elongation at break of less than 10%, and a crystallinity of greater than 60%.

As the polyethylene fibers prepared according to the process disclosed in the present invention provide the above mentioned advantageous properties, they can be used in a wide variety of applications. For example, the polyethylene fibers of this invention can be used in the manufacturing of high strength ropes, cables, fishing nets, fishing strings, canvas, composite materials, pressure vessels, hoses, sporting and automotive equipment, and building materials.

DESCRIPTION OF THE PREFERRED EMBODIMENT

FIG. 1 illustrates in schematic form a preferred embodiment of the invention. In FIG. 1, it is shown a dissolution vessel 13, to which an ultra-high molecular weight polyethylene polymer 10 was fed, and to which a first solvent 11 was also fed. The dissolution vessel 13 was equipped with an agitator 12. The temperature in the dissolution vessel 13 was maintained above 130° C. to allow the polyethylene polymer 10 to be completely dissolved in the first solvent 11.

From the dissolution vessel 13, the solution was charged into a spinneret 17 through a pipe 14 using a metering pump 16. The metering pump 16 was driven at a speed so that the polyethylene solution was extruded through spinneret 17 at a predetermined flow rate. The polyethylene solution was forced to pass through a plurality of capillary holes (not shown) to form gel fibers 20. The gel fibers 20 containing polyethylene and the first solvent passed through an air gap 22 and into an extraction vessel 18, in which the first solvent 11 contained in the gel fiber 20 was extracted by the second solvent 19. A feed roll 21 in the extraction vessel 18 was operated to guide the gel fibers 20 into transfer rolls 23, 24, 25.

From rolls 23, 24, and 25, the gel fibers were fed into a heating area 26. In the heating area 26, the gel fibers were dried and guided over draw roll 27 and idler roll 28 into a first heating and stretching area 29, which had a temperature of 80°–120° C. The fibers were stretched in the first stretching area 29 at a stretch ratio of at least 4/1 so as to form partially stretched fibers which were taken up by draw roll 30 and idler roll 31.

From rolls 30 and 31, the partially stretched fibers were guided through a second heating and stretching area 32, which had a temperature of 100°–130° C. The partially stretched fibers were heated, stretched and then taken up by draw roll 33 and idler roll 34. The partially stretched fibers were stretched in the second stretching area 32 at a stretch ratio of at least 3/1.

From rolls 33 and 34, the twice stretched fibers were guided through a third heating and stretching area 35, which had a temperature of 120°–150° C. The twice stretched fibers were heated, stretched and then taken up by draw roll 36 and idler roll 37. The polyethylene fibers were stretched in the third stretching area 35 at a stretch ratio of at least 2/1. The thrice stretched fibers produced in this embodiment were taken up by take-up spool 38.

The present invention will now be described more specifically with reference to the following examples. It is to be noted that the following descriptions of examples including preferred embodiments of this invention are presented herein for purpose of illustration and description; it is not intended to be exhaustive or to limit the invention to the precise form disclosed.

EXAMPLE 1

Into a dissolution vessel was charged a 5.0 wt % polyethylene polymer solution in dipentene, the polyethylene polymer having a molecular weight of approximately $2 \times 10^6$ and a molecular weight distribution ($M_w/M_n$) of approximately 5. The polyethylene solution was heated with agitation to 140° C., the agitation was maintained at 140° C. to achieve complete dissolution of the polyethylene polymer.

The polymer solution was fed into a spinneret having a single capillary hole of 1.5 mm diameter and was extruded under a pressure of 1 KPa. The spinneret was maintained at a temperature of 150° C. The extruded solution filament was guided to pass through a 5 cm long air gap, and was then quenched and extracted in a gel filament state, by passing the same through an extraction vessel filled with cyclohexanone as the extracting solvent. The gel filament was guided into a three-stage stretching area, wherein the gel filament was stretched at a temperature of 80° C. and a stretch ratio of 4/1 in the first stretching stage, at a temperature of 115° C. and a stretch ratio of 3/1 in the second stage, and at a temperature of 135° C. and a stretch ratio of 2/1 in the third stage. Finally the trice stretched polyethylene fiber were taken up at a speed of 720 m/min. The properties of the stretched fiber were:
  denier: 5
  tenacity: 28 g/d
  modulus: 1040 g/d
  elongation: 4.2%

Figure 4A:
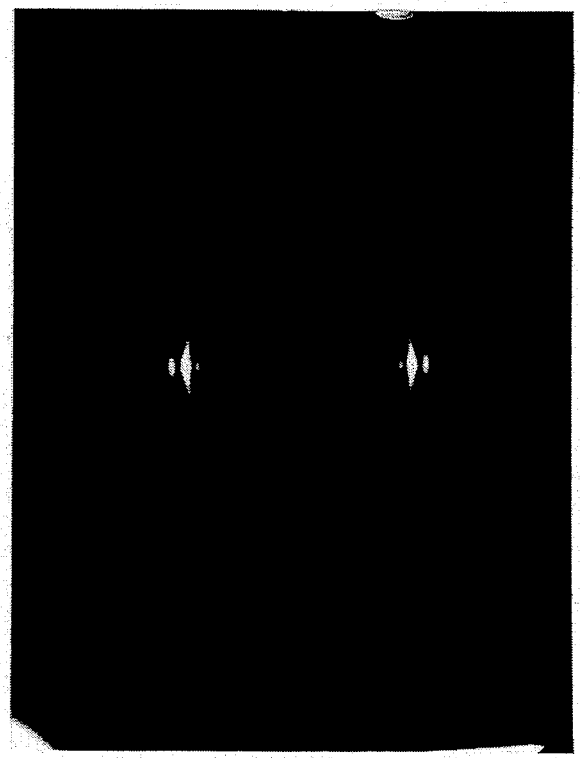
FIG. 4A is a photograph of X-ray diffraction pattern of the polyethylene fibers before stretching, as prepared according to Example 1 of the present invention.
Figure 4B:
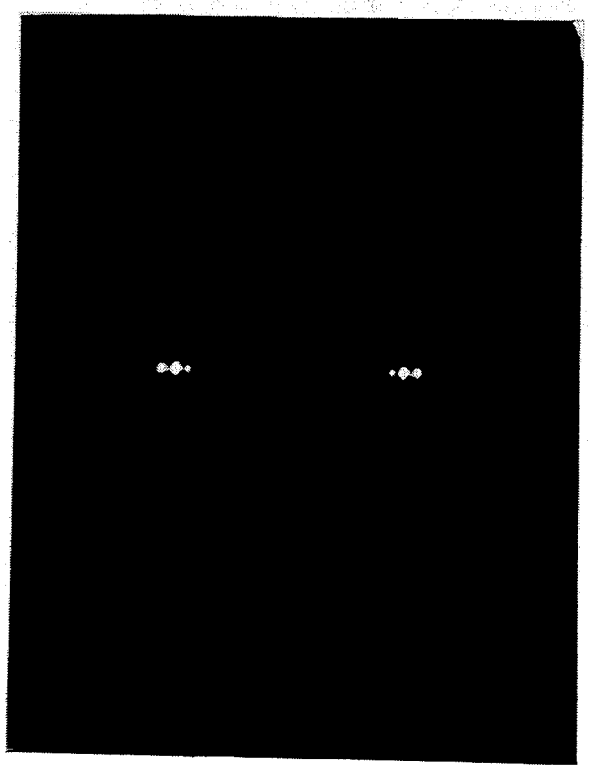
FIG. 4B is a photograph of X-ray diffraction pattern of the polyethylene fibers after stretching, as prepared according to Example 1of the present invention.

The X-ray diffraction patterns of the polyethylene fibers before and after stretching, are shown respectively in FIG. 4A and FIG. 4B, respectively.

EXAMPLES 2–8

Figure 2:
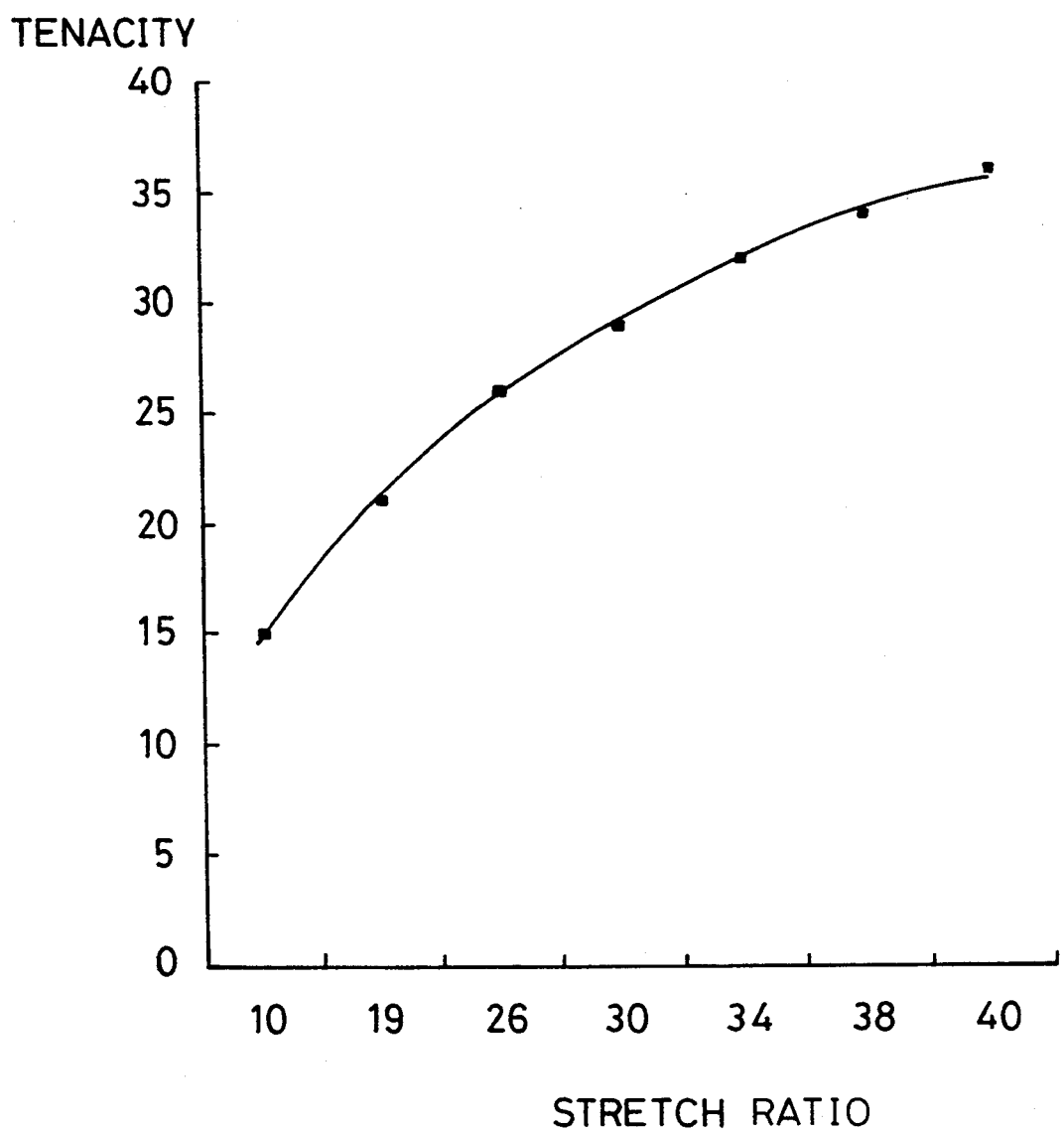
FIG. 2 is a graphic correlation of the tenacity of polyethylene fibers prepared according to the present invention versus stretch ratio values.
Figure 3:
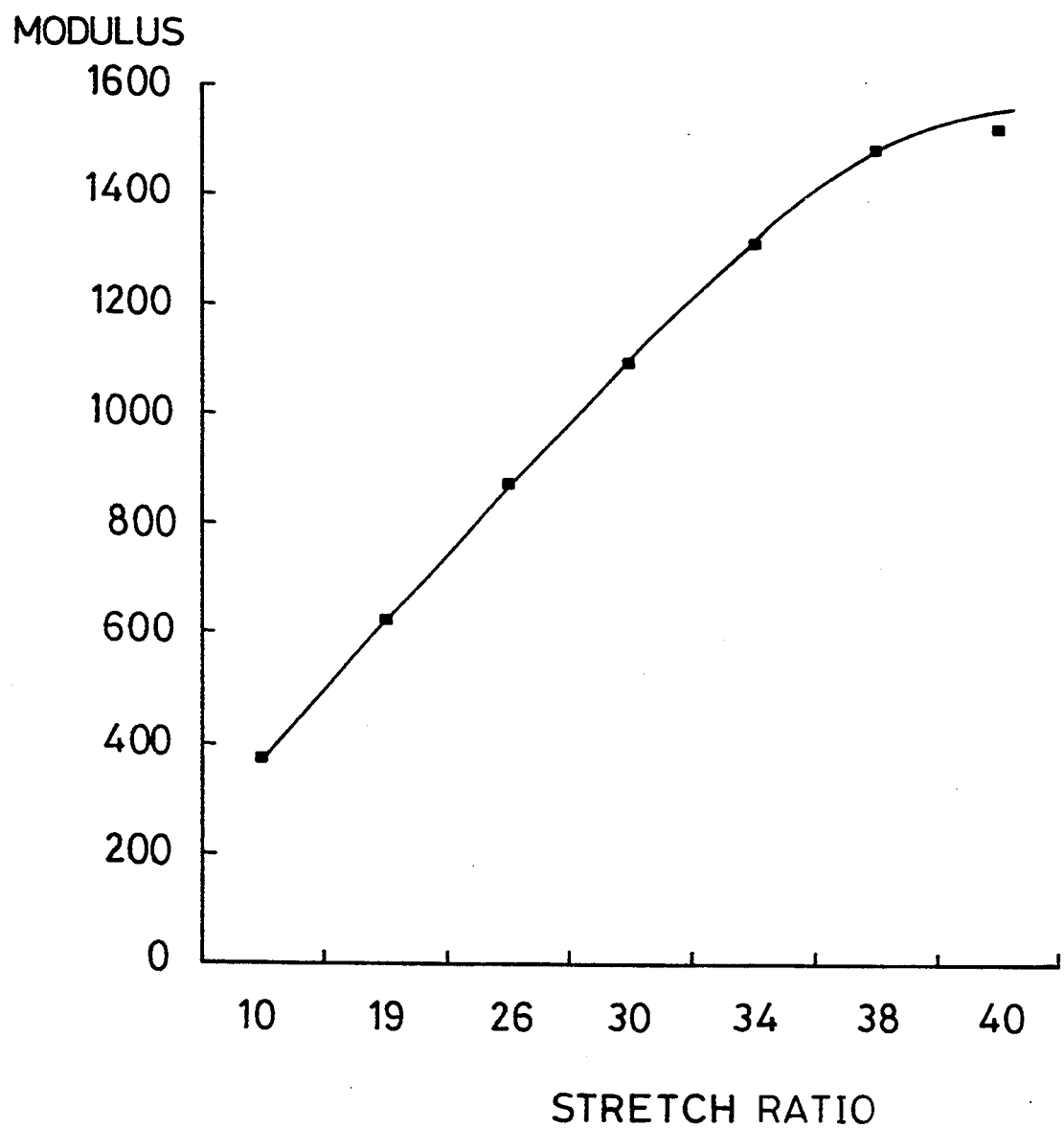
FIG. 3 is a graphic correlation of the modulus of polyethylene fibers prepared according to the present invention versus stretch ratio values.

A series of fiber samples was prepared according to the procedures described in Example 1, except that the stretch ratios as set forth in Table 1 were used. The moduli and tenacities of the fiber samples in these examples are presented in Table 1. These test results are depicted respectively in FIG. 2 and FIG. 3.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

TABLE 1

| Example No. | Stretch Ratio | Modulus g/d | Tenacity g/d |
|---|---|---|---|
| 2 | 10 | 370 | 15 |
| 3 | 19 | 620 | 21 |
| 4 | 26 | 870 | 26 |
| 5 | 30 | 1090 | 29 |
| 6 | 34 | 1310 | 32 |
| 7 | 38 | 1480 | 34 |
| 8 | 40 | 1520 | 36 |

What is claimed is:

1. A process for making high tenacity and high modulus polyethylene fibers which comprises the following steps:
    (a) preparing a 2–20wt % polyethylene solution containing a polyethylene polymer dissolved in a first solvent selected from the group consisting of cycloalkane, cycloalkene, their derivatives, and mixtures thereof, said first solvent having a boiling point above 100° C., and said polyethylene polymer having a weight average molecular weight $2 \times 10^5$ and $4 \times 10^6$;
    (b) extruding said polyethylene solution through a spinneret at a temperature above 120° C. to form a gel fiber therefrom;
    (c) extracting said first solvent from said gel fiber with a second solvent selected from the group consisting of methanol, ethanol, ether, acetone, cyclohexanone, 2-methylpentanone, dichloromethane, n-hexane, heptane, trichlorotrifluroethane, and dioxane, and mixtures thereof, said second solvent being able to readily replace said first solvent without causing significant changes in said gel fiber structure; and
    (d) stretching said gel fiber directly after the extraction step and without an intermediate winding step between said stretching step and said extraction step, at a stretching ratio of at least 10 to 1.

2. The process as claimed in claim 1, wherein said polyethylene polymer has a $M_w/M_n$ ratio less than 10.

3. The process as claimed in claim 2, wherein said polyethylene polymer has a weight average molecular weight of about $2 \times 10^6$ and a $M_w/M_n$ ratio of about 5.

4. The process as claimed in claim 1, wherein said first solvent is selected from the group consisting of carene, fluorene, camphene, menthane, dipentene, naphthalene, acenaphthene, methylcyclopentadiene, tricyclodecane, 1,2,4,5-tetramethyl-1, 4-cyclohexadiene, fluorenone, naphthindane, tetramethyl-p-benzodiquinone, ethylfluorene, fluoranthene, and naphthenone.

5. The process as claimed in claim 4 wherein said first solvent is dipentene.

6. The process as claimed in claim 1, wherein said second solvent is cyclohexanone.

7. The process as claimed in claim 1, wherein said second solvent mixture comprises cyclohexanone.

8. The process as claimed in claim 1, wherein said second solvent is diethyl ether.

9. The process as claimed in claim 1, wherein said extruding step (b) is conducted by extruding said polyethylene solution through a spinneret having a capillary diameter of 0.2 to 5 mm.

10. The process as claimed in claim 1, wherein said stretching step (d) is conducted in at least two stages.

11. The process as claimed in claim 8, wherein the stretching is performed in three stages with the first stage performed at a temperature of about 80° C. and a stretch ratio of about 4 to 1, the second stage performed at a temperature of about 115° C. and a stretch ratio of about 3 to 1, and the third stage performed at a temperature of about 135° C. and a stretch ratio of about 2 to 1.

12. The process as claimed in claim 1, wherein said polyethylene fiber having a tenacity of at least 15 g/denier, a modulus of at least 350 g/denier.

13. The process as claimed in claim 12, wherein said polyethylene fiber further having an elongation at break of less than 10%, and a crystallinity of greater than 60%.

* * * * *